(12) United States Patent
Yu

(10) Patent No.: US 10,594,185 B2
(45) Date of Patent: Mar. 17, 2020

(54) ROTOR ASSEMBLY AND MOTOR INCLUDING SAME

(71) Applicant: LG Innotek Co., Ltd., Seoul (KR)

(72) Inventor: Hyun Soo Yu, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 271 days.

(21) Appl. No.: 15/535,335

(22) PCT Filed: Dec. 4, 2015

(86) PCT No.: PCT/KR2015/013211
§ 371 (c)(1),
(2) Date: Jun. 12, 2017

(87) PCT Pub. No.: WO2016/093559
PCT Pub. Date: Jun. 16, 2016

(65) Prior Publication Data
US 2017/0338711 A1    Nov. 23, 2017

(30) Foreign Application Priority Data

Dec. 10, 2014    (KR) .................. 10-2014-0177527

(51) Int. Cl.
*H02K 5/04* (2006.01)
*H02K 7/00* (2006.01)
(Continued)

(52) U.S. Cl.
CPC ............... *H02K 5/04* (2013.01); *H02K 1/22* (2013.01); *H02K 1/24* (2013.01); *H02K 3/46* (2013.01);
(Continued)

(58) Field of Classification Search
CPC .. H02K 5/04; H02K 1/22; H02K 1/24; H02K 3/46; H02K 3/527; H02K 7/003; H02K 9/06; H02K 2213/03
(Continued)

(56) References Cited

U.S. PATENT DOCUMENTS 5,714,810 A    2/1998  Yuhi et al.
7,345,439 B2   3/2008  Kuribayashi et al.
(Continued)

FOREIGN PATENT DOCUMENTS

CH          409 104 A    3/1966
DE   10 2006 038 909 A1  2/2008
(Continued)

OTHER PUBLICATIONS

Office Action dated Dec. 20, 2018 in European Application No. 15 867 306.1.
(Continued)

*Primary Examiner* — Forrest M Phillips
(74) *Attorney, Agent, or Firm* — Saliwanchik, Llyod & Eisenschenk

(57) ABSTRACT

Disclosed in an embodiment are a rotor assembly and a motor including the same, the rotor assembly including: a rotor part; and a first cover including a first fixing plate for covering one side of the rotor part and a plurality of first vane parts protruding from the first fixing plate, wherein a first angle, which is formed by an imaginary line extending from an outer end of each of the first vane parts and a tangential line of a first imaginary circle, is greater than a second angle formed by an imaginary line extending from an inner end of each of the first vane parts and a tangential line of a second imaginary circle, centers of the first imaginary circle and the second imaginary circle are the same as a center of the first fixing plate, the tangential line of the first
(Continued)

imaginary circle is a tangential line at a position at which the first imaginary circle and the outer end meet and the tangential line of the second imaginary circle is a tangential line at a position at which the second imaginary circle and the inner end meet.

16 Claims, 6 Drawing Sheets

(51) Int. Cl.
    *H02K 1/24*     (2006.01)
    *H02K 3/52*     (2006.01)
    *H02K 1/22*     (2006.01)
    *H02K 3/46*     (2006.01)
    *H02K 9/06*     (2006.01)
    *H02K 3/487*     (2006.01)

(52) U.S. Cl.
    CPC ............. *H02K 3/527* (2013.01); *H02K 7/003* (2013.01); *H02K 9/06* (2013.01); *H02K 3/487* (2013.01); *H02K 2213/03* (2013.01)

(58) Field of Classification Search
    USPC ........................................................ 310/60 R
    See application file for complete search history.

(56) References Cited

U.S. PATENT DOCUMENTS

| | | | |
|---|---|---|---|
| 2001/0030487 A1 | 10/2001 | Higashino et al. | |
| 2011/0057523 A1* | 3/2011 | Li | H02K 1/278 310/64 |
| 2011/0123375 A1* | 5/2011 | Ostergaard | F04D 29/584 417/423.8 |
| 2014/0091670 A1* | 4/2014 | Chun | H02K 3/46 310/214 |
| 2014/0292163 A1* | 10/2014 | Lau | H02K 9/06 310/60 R |
| 2016/0094109 A1 | 3/2016 | Minoshima et al. | |
| 2016/0172936 A1* | 6/2016 | Schueler | H02K 5/225 310/60 R |
| 2016/0204677 A1* | 7/2016 | Chou | H02K 5/20 310/60 R |

FOREIGN PATENT DOCUMENTS

| | | |
|---|---|---|
| EP | 1 450 468 A2 | 8/2004 |
| EP | 1 450 468 A3 | 12/2004 |
| FR | 3 004 865 A1 | 10/2014 |
| JP | S57-007874 U | 6/1982 |
| JP | S60-190163 U | 12/1985 |
| JP | 5-91173 U | 12/1993 |
| JP | H08-331807 A | 12/1996 |
| JP | 2000-60045 A | 2/2000 |
| JP | 2001-298921 A | 10/2001 |
| JP | 2009-278751 A | 11/2009 |
| JP | 2012-200087 A | 10/2012 |
| JP | 2011-062076 A | 3/2019 |
| WO | WO-2013/136022 A2 | 9/2013 |
| WO | WO-2013/136022 A3 | 9/2013 |
| WO | WO-2014/174721 A1 | 10/2014 |

OTHER PUBLICATIONS

Supplementary European Search Report in European Application No. 15867306.1 dated Nov. 28, 2017.

International Search Report in International Application No. PCT/KR2015/013211, filed Dec. 4, 2015.

Office Action dated Jul. 25, 2019 in European Application No. 15 867 306.1.

Office Action dated Sep. 17, 2019 in Japanese Application No. 2017-530275.

* cited by examiner

ROTOR ASSEMBLY AND MOTOR INCLUDING SAME

CROSS-REFERENCE TO RELATED APPLICATIONS

This application is the U.S. national stage application of International Patent Application No. PCT/KR2015/013211, filed Dec. 4, 2015, which claims priority to Korean Application No. 10-2014-0177527, filed Dec. 10, 2014, the disclosures of each of which are incorporated herein by reference in their entirety.

TECHNICAL FIELD

The present invention relates to a rotor assembly with excellent heat dissipation and noise-reducing performances.

BACKGROUND ART

Generally, a vehicle includes a starter motor which drives an engine and an alternator which generates power using rotating force of the engine.

The starter motor rotates an engine when battery power is supplied.

The alternator generates alternating current power when a rotor rotates by driving force of the engine while a magnetic field is formed and charges a battery with the alternating current power using a rectifier or the like.

Both of the starter motor and the alternator have a very similar structure by having a stator and rotor structure, and may be operated as a generator or a motor depending on whether force or power is applied.

Recently, a belt driven starter and generator (BSG) motor which can function as a starter motor and an alternator with a single structure has been actively studied.

The motor generates heat in a process of rotation, and thus it is important to quickly discharge the generated heat to the outside to prevent the performance of the motor from being degraded. Particularly, it is more important when a motor, such as the BSG motor which simultaneously performs starter motor and alternator functions, has a structure of high-speed rotation.

Also, a motor noise is also an important factor to determine the performance of the motor, and thus it is important to minimize the noise.

DISCLOSURE

Technical Problem

The present invention is directed to providing a rotor assembly which is excellent in heat dissipation.

Also, the present invention is directed to providing a rotor assembly minimizing noise.

Technical Solution

One aspect of the present invention provides a rotor assembly including a rotor part, and a first cover including a first fixed plate covering one side of the rotor part and a plurality of first vane parts protruding from the first fixed plate, wherein a first angle between an imaginary line extending from an outer end of each of the first vane parts and a tangential line of a first imaginary circle is greater than a second angle between an imaginary line extending from an inner end of each of the first vane parts and a tangential line of a second imaginary circle, centers of the first imaginary circle and the second imaginary circle correspond to a center of the first fixed plate, the tangential line of the first imaginary circle is a tangential line at a point at which the first imaginary circle and the outer end meet, and the tangential line of the second imaginary circle is a tangential line at a point at which the second imaginary circle and the inner end meet.

The first imaginary circle may be a circle connecting the outer ends of the plurality of first vane parts, and the second imaginary circle may be a circle connecting the inner ends of the plurality of first vane parts.

The first angle may be greater than 50° and less than 60°, and the second angle may be greater than 25° and less than 35°.

The plurality of first vane parts may be inclined in a rotation direction of a motor.

The plurality of first vane parts may be inclined in the direction opposite to a rotation direction of a motor.

The first cover may include a through hole formed in the first fixed plate.

The rotor part may include a plurality of slits formed in a longitudinal direction, and the first cover may include a support part inserted into the plurality of slits and fixed to the rotor part.

The rotor part may include a rotor core including a center part, a plurality of connection parts formed radially from the center part, and a plurality of protrusion parts protruding from both ends of the connection parts in a circumferential direction, and a first coil wound around the connection parts.

The rotor assembly may further include a rotation shaft passing through the center part of the rotor core and a terminal supported on the rotation shaft and applying power to the first coil.

The first fixed plate may include a ting-shaped edge part having the first vane parts formed thereon and a center part sunken from the edge part.

The rotor assembly may further include a second cover covering the other side of the rotor part, wherein the second cover may include a second fixed plate covering the other side of the rotor part and a second vane part protruding from the second fixed plate, and the second cover may be formed to be symmetrical to the first cover.

Another aspect of the present invention provides a motor including a housing having a plurality of through holes formed on an outer circumferential surface thereof, a stator part supported by the housing, and the above-described rotor assembly.

The housing may include a first housing disposed on one side of the stator part, and a second housing disposed on the other side of the stator part.

A part of the rotor assembly may be exposed between the first housing and the second housing.

The housing may include a plurality of heat dissipation parts formed along an outer circumferential surface thereof.

Advantageous Effects

According to an exemplary embodiment of the present invention, the rotor is excellent in heat dissipation.

Also, the length of the rotation shaft can be shorter, and the motor can be miniaturized.

Also, a noise is reduced even during a high speed rotation.

The various and advantageous advantages and effects of the present invention are not limited to the above description

MODES OF THE INVENTION

Figure 1:
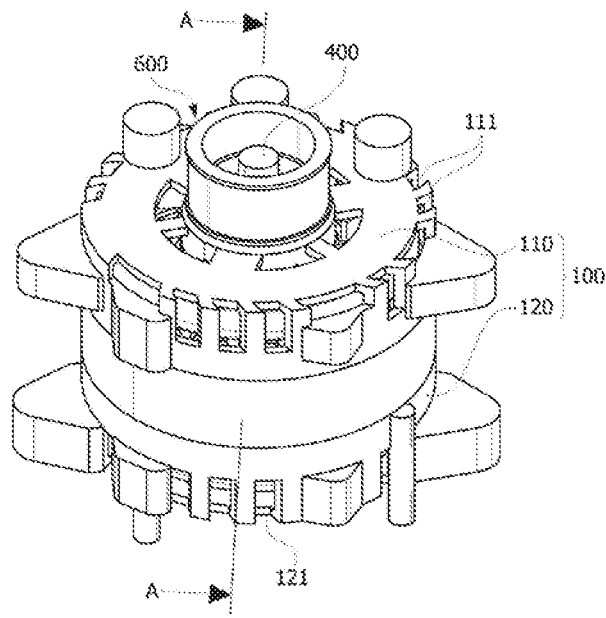
FIG. 1 is a perspective view of a motor according to one embodiment of the present invention.

While the invention can be modified in various ways and take on various alternative forms, specific embodiments thereof are shown in the drawings and described in detail below as examples.

However, there is no intent to limit the invention to the particular forms disclosed. On the contrary, the invention is to cover all modifications, equivalents, and alternatives falling within the spirit and scope of the present invention.

It will be further understood that the term "comprise" or "have" used in this specification specifies the presence of stated features, numerals, steps, operations, components, parts, or a combination thereof, but do not preclude the presence or addition of one or more other features, numerals, steps, operations, components, parts, or a combination thereof.

It is also to be understood that accompanying drawings in the present invention are shown to be enlarged or downsized for convenience of description.

Hereinafter, exemplary embodiments of the present invention will be described in detail with reference to the accompanying drawings. The same reference numerals will be used to describe the same or like components regardless of figure numbers and a repeated description thereof will be omitted.

Figure 2:
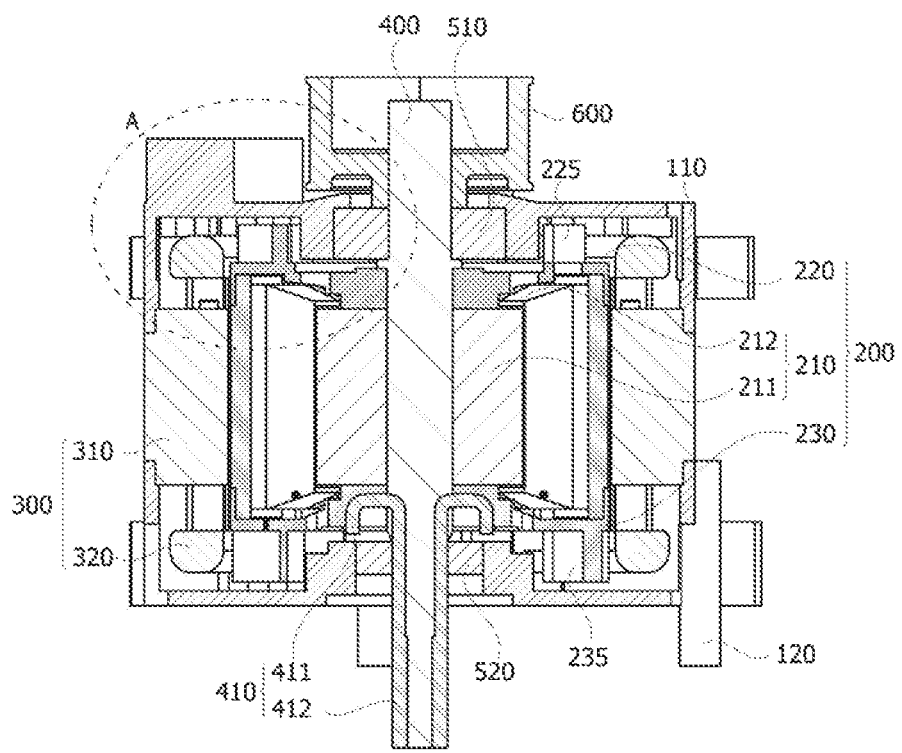
FIG. 2 is a cross-sectional view taken along A-A of FIG. 1.
Figure 3:
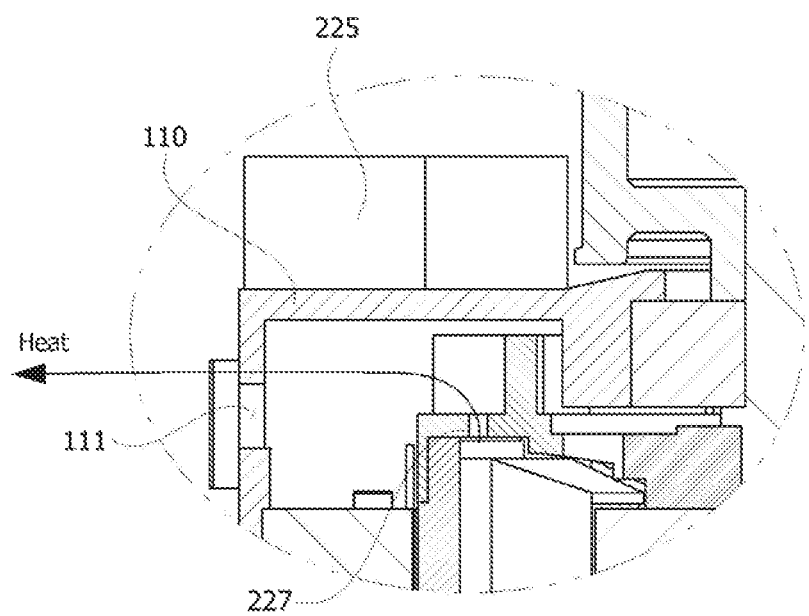
FIG. 3 is a reference view for describing a process in which heat is discharged from the motor according to one embodiment of the present invention.

FIG. 1 is a perspective view of a motor according to one embodiment of the present invention, FIG. 2 is a cross-sectional view taken along A-A of FIG. 1, and FIG. 3 is a reference view for describing a process in which heat is discharged from the motor according to one embodiment of the present invention.

Referring to FIGS. 1 and 2, a motor according to the present invention includes a housing 100 having a plurality of through holes 111 and 121 formed on an outer circumferential surface thereof, a stator part 300 supported by the housing 100, and a rotor assembly 200 disposed in the stator part 300.

When the motor is operated as an alternator, a pulley 600 is rotated by driving of the engine, and the rotor assembly 200 is rotated, and thus an alternating current is generated. The generated alternating current is converted into a direct current, and the direct current may be supplied to an external component (a battery or the like). On the contrary, when the motor is operated as a starter, the rotor assembly 200 is rotated by a current applied from the outside, and the pulley 600 is rotated, and thus an external component (an engine or the like) may be driven.

The housing 100 includes a first housing 110 disposed on one side of the stator part 300, and a second housing 120 disposed on the other side of the stator part 300. The first housing 110 and the second housing 120 include a plurality of through holes 111 and 121 formed in a circumferential direction. The through holes 111 and 121 function as a heat dissipation part discharging heat generated in the motor to the outside.

Protrusions (not shown) coupled to an outer surface of the stator part 300 may be each formed on inner circumferential surfaces of the first housing 110 and the second housing 120.

The stator part 300 includes a stator core 310 and a second coil 320 wound around the stator core 310. A part of the stator core 310 may be exposed between the first housing 110 and the second housing 120. Therefore, heat generated in the stator part 300 may be easily discharged to the outside. However, it is not necessarily limited thereto, and the stator part 300 may be disposed in the housing 100.

The rotor assembly 200 includes a rotor part 210, and a first cover 220 covering the rotor part 210, and a second cover 230. The rotor part 210 rotates in the stator part 300 and includes a rotor core 211 and a first coil 212. A configuration of the rotor part 210 is not necessarily limited thereto, and a magnet may be attached to an inside or outer circumferential surface of the rotor core 211.

The first cover 220 and the second cover 230 are coupled to the rotor part 210 and integrally rotate with the rotor part 210. The first cover 220 and the second cover 230 may be formed in the same shape and may be each disposed on one side and the other side of the rotor part 210.

The first cover 220 and the second cover 230 include protruding vane parts 225 and 235. The vane parts 225 and 235 function as a cooling fan generating a flow of gas when the rotor assembly 200 rotates. The vane parts 225 and 235 may have a predetermined curvature to easily generate the flow of gas.

Referring to FIG. 3, when the rotor assembly 200 rotates, a flow of gas is generated in the motor by a first vane part 225. Therefore, heat generated in the rotor part 210 is quickly discharged to the outside through through holes 227 formed on the fixed plate of the first cover 220 and the through hole 111 formed on the first housing 110. The configuration is advantageous for a motor in which much heat is generated by high-speed rotation.

Referring again to FIG. 2, a rotation shaft 400 integrally rotates with the rotor assembly 200. One end and the other end of the rotation shaft 400 are supported by a first bearing 510 and a second bearing 520. The belt pulley 600 may be coupled to an end of the rotation shaft 400 to transfer power to the outside.

A terminal part 410 applying power to the first coil 212 wound around the rotor core 211 is disposed in the rotation shaft 400. The terminal part 410 includes a first terminal 411 electrically connected with the first coil 212 and a second terminal 412 connected with the first terminal 411 and exposed to the outside.

Figure 4:
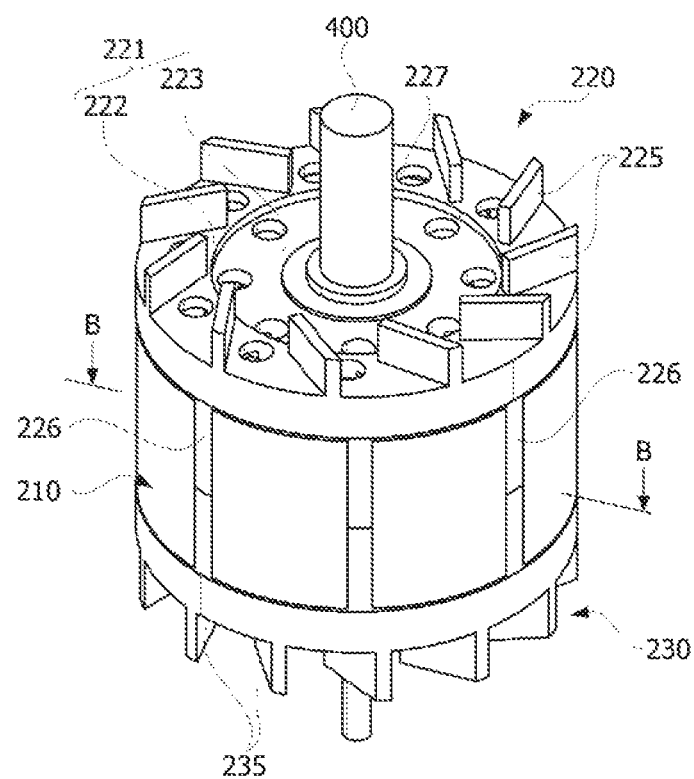
FIG. 4 is a perspective view of a rotor assembly according to one embodiment of the present invention.
Figure 5:
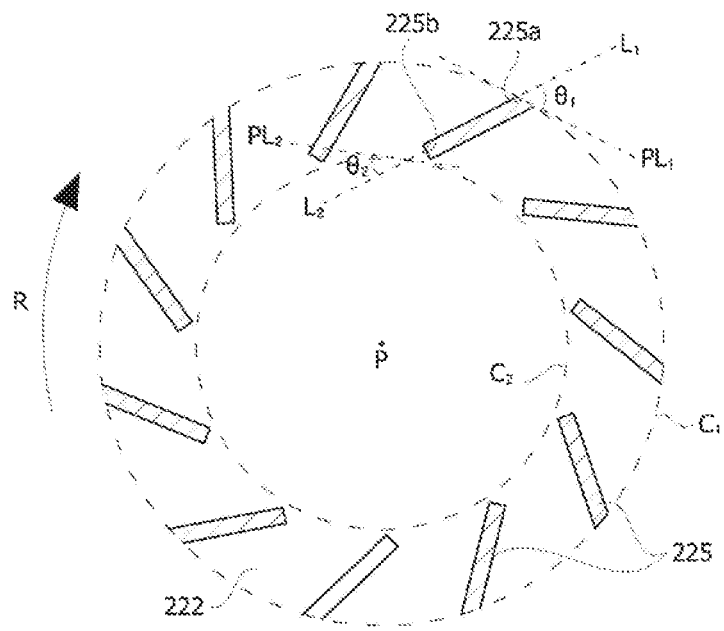
FIG. 5 is a conceptual view for describing an optimal angle of a vane part of the rotor assembly according to one embodiment of the present invention.

FIG. 4 is a perspective view of a rotor assembly according to one embodiment of the present invention, and FIG. 5 is a conceptual view for describing an optimal angle of a vane part of the rotor assembly according to one embodiment of the present invention.

Referring to FIG. 4, the first cover 220 includes a first fixed plate 221 covering one side of the rotor part 210, the first vane part 225 protruding from the first fixed plate 221 in an axial direction, and a first support part 226 connected with the first fixed plate 221.

The first cover 220 may be formed with resin. Therefore, the first fixed plate 221, the first vane part 225, and the first support part 226 are integrally formed. This structure can facilitate production in comparison with a structure in which each component is produced and assembled, have reduced manufacturing costs, and have a high degree of freedom in design.

The first fixed plate 221 of the first cover 220 may include a ring-shaped edge part 222 and a center part 223 sunken from the edge part 222.

The edge part 222 has a ring shape and may have the plurality of through holes 227 and the first vane parts 225 disposed in a circumferential direction. The through holes 227 and the first vane parts 225 may be regularly or irregularly disposed.

The center part 223 is a portion through which the rotation shaft 400 is inserted and may be concave from the edge part 222. As necessary, the through holes 227 may be formed even at the center part 223. The height of the center part 223 of the first fixed plate 221 is decreased, and the height of the belt pulley 600 of FIG. 2 is also decreased, and thus the motor can be miniaturized.

Referring to FIG. 5, the first vane part 225 has a first angle $\theta 1$ between an imaginary line L1 extending from an outer end 225a and a tangential line PL1 of a first imaginary circle C1 greater than a second angle $\theta 2$ between an imaginary line L2 extending from an inner end 225b of the first vane part 225 and a tangential line PL2 of a second imaginary circle C2. The first angle $\theta 1$ is an angle of an outlet through which heat is discharged, and a second angle $\theta 2$ is an angle of an inlet through which the heat is input.

Hereinafter, the first imaginary circle C1 is an imaginary circle connecting the outer ends 225a of the plurality of first vane parts 225, and the second imaginary circle C2 is an imaginary circle connecting the inner ends 225b of the plurality of first vane parts 225. The centers of the first imaginary circle C1 and the second imaginary circle C2 correspond to a center P of the first fixed plate 221.

The tangential line PL1 of the first imaginary circle is a tangential line at which the first imaginary circle C1 and the outer end 225a of the first vane part 225 meet, and the tangential line PL2 of the second imaginary circle may be a tangential line at which the second imaginary circle C2 and the inner end 225b meet. The tangential line is defined as a line vertical to the radius of the imaginary circle at a point at which the imaginary circle meet.

The first vane parts 225 are formed radially from the center of the first fixed plate 221 and may be formed to be inclined in a rotation direction R of the motor. That is, on the basis of drawing, as the first vane parts 225 extend from the inner ends 225b of the first vane parts 225 to the outer ends 225a thereof, the first vane parts 225 may be formed to be inclined in a rotation direction of the motor. However, it is not necessarily limited thereto and may be formed to be inclined in the opposite direction to the rotation direction of the motor.

Distances between the plurality of first vane parts 225 may be equal as a whole or may be equal only in a specific section. The first vane parts 225 may be actually straight or may have a predetermined curvature if the first angle $\theta 1$ is greater than the second angle $\theta 2$.

Table 1 shows a flow rate (unit: ccm) of gas generated in the motor rotating at a speed of 10000 rpm at the first angle $\theta 1$ and the second angle $\theta 2$, and table 2 shows a noise (unit: dB) in the motor rotating at a speed of 6000 rpm at the first angle $\theta 1$ and the second angle $\theta 2$.

TABLE 1

|  | $\theta 1$ | | |
|---|---|---|---|
| $\theta 2$ | 50 | 55 | 60 |
| 25 | 2.4 | 2.5 | 2.65 |
| 30 | 2.3 | 2.78 | 7.7 |
| 35 | 2.7 | 2.34 | 2.79 |

TABLE 2

|  | $\theta 1$ | | |
|---|---|---|---|
| $\theta 2$ | 50 | 55 | 60 |
| 25 | 72 | 73.5 | 72.2 |
| 30 | 71 | 72 | 72.4 |
| 35 | 70.8 | 71 | 77 |

As shown in tables 1 and 2, when the first angle $\theta 1$ is greater than 50° and less than 60° and the second angle $\theta 2$ is greater than 25° and less than 35°, the flow rate of gas is increased to about 2.78 ccm, and thus the heat dissipation efficiency is increased while the noise is reduced to 72 dB.

Therefore, when compared to a motor with a different vane shape in a group of motors having the same outer diameter of 150 mm, the noise may be decreased to 72 dB or less at a speed of 6000 rpm, the temperature of a rotor coil may be controlled to be less than or equal to 107.8° C. at a speed of 2000 rpm, and the temperature of a stator coil may be controlled to be less than or equal to 88.7° C. Also, there is an advantage in that rotation load torque may be controlled to 0.11 N.M at a speed of 10000 rpm. In this case, a vane part may be more effective when the vane part is inclined in the rotation direction of the motor.

Figure 6:
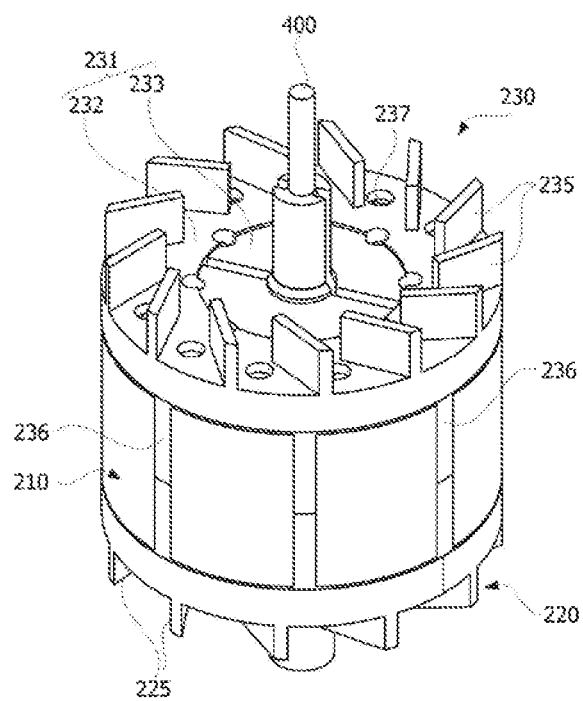
FIG. 6 is a perspective view of the rotor assembly according to one embodiment of the present invention viewed from other direction.

Referring to FIG. 6, the second cover 230 includes a second fixed plate 231 covering the other side of the rotor part 210, the second vane part 235 protruding from the second fixed plate 231, and a second support part 236 connected to the second fixed plate 231.

Also, the second fixed plate 231 includes a ring-shaped edge part 232 and a center part 233 sunken from the the edge part 232.

The second cover 230 has a different position coupled to the rotor part 210, but has the same shape as the first cover 220. That is, the first cover 220 and the second cover 230 are rotationally symmetric around a direction vertical to an axial direction (a longitudinal direction of the rotation shaft). The first cover 220 and the second cover 230 may be manufactured with the same mold and thus manufacturing costs may be reduced.

Figure 7:
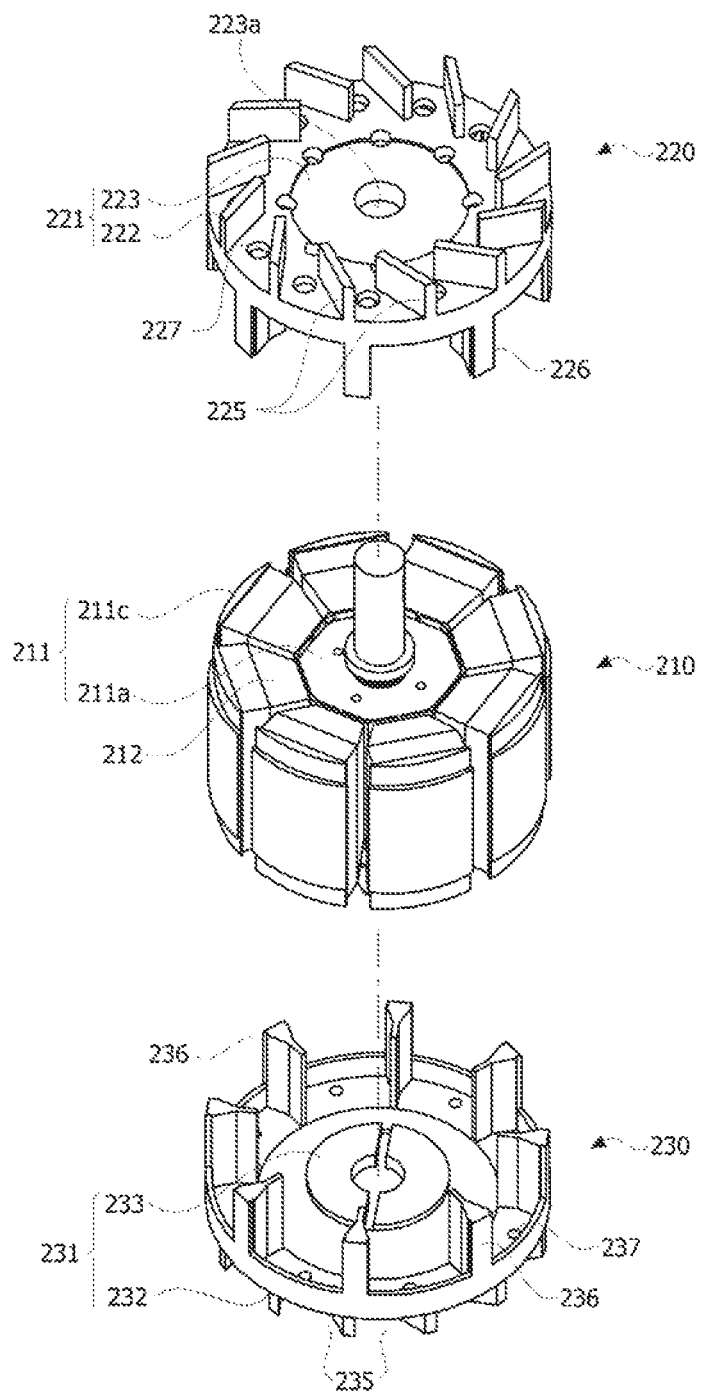
FIG. 7 is an exploded perspective view of the rotor assembly according to one embodiment of the present invention.
Figure 8:
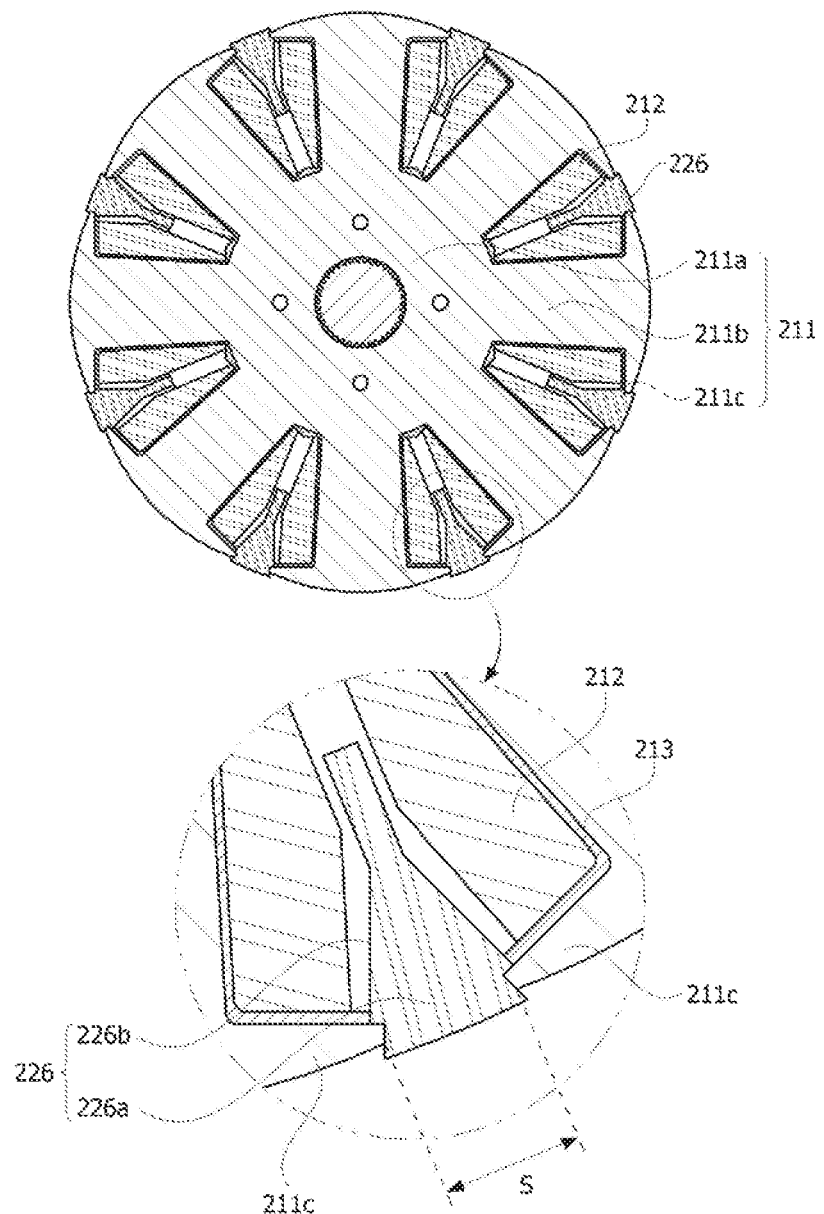
FIG. 8 is a cross-sectional view taken along B-B of FIG. 4.

FIG. 7 is an exploded perspective view of the rotor assembly according to one embodiment of the present invention, and FIG. 8 is a cross-sectional view taken along B-B of FIG. 4.

Referring to FIGS. 7 and 8, the first support part 226 and the second support part 236 are inserted into slits S formed in the rotor part 211 in a longitudinal direction. That is, the first support part 226 and the second support part 236 are each inserted into one slit S. The drawing shows that the first coil 212 is wound around the rotor core 211. As necessary, the rotor core has a cylinder shape and may have a structure in which the slits S are formed on an outer circumferential surface thereof.

The first support part 226 and the second support part 236 may be fixed to the slits S. Therefore, the first cover 220 is fixed to the rotor part 210 by the first support part 226, and the second cover 230 is fixed to the rotor part 210 by the second support part 236. Heat generated in the first coil 212 when the motor assembly rotates may be quickly discharged through the through holes 227 of the first cover 220 and through holes 237 of the second cover 230.

Referring to FIG. 8, the rotor core 211 includes a center part 211a, a plurality of connection parts 211b radially formed in the center part 211a, and a plurality of protrusion parts 211c protruding from both ends of the connection parts 211b in a circumferential direction.

The first coil 212 is wound around the connection parts 211b, and an insulation member 213 is disposed between the connection parts 211b and the first coil 212. In this case, the slits S may be defined as spaces between the protrusion parts 211c of the rotor core 211.

The first support part 226 includes a coupling part 226a coupled to the slit S and a tapered part 226b that gets narrower toward the center from the coupling part 226a.

The tapered part 226b supports and/or presses the first coil 212 wound around the rotor part 210. Therefore, even when the motor quickly rotates, the first coil 212 is prevented from escaping using the tapered part 226b to increase reliability of the motor. As described above, the first support part 226 and the second support part 236 are made of a non-conductive material to prevent short-circuit.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

The invention claimed is:

1. A rotor assembly comprising:
   a rotor part; and
   a first cover including a first fixed plate covering one side of the rotor part and a plurality of first vane parts protruding from the first fixed plate,
   wherein a first angle between an imaginary line extending from an outer end of each of the first vane parts and a tangential line of a first imaginary circle is greater than a second angle between an imaginary line extending from an inner end of each of the first vane parts and a tangential line of a second imaginary circle,
   wherein centers of the first imaginary circle and the second imaginary circle correspond to a center of the first fixed plate,
   wherein the tangential line of the first imaginary circle is a tangential line at a point at which the first imaginary circle and the outer end meet,
   wherein the tangential line of the second imaginary circle is a tangential line at a point at which the second imaginary circle and the inner end meet,
   wherein the first vane parts are configured to have the first angles greater than 50° and smaller than 60° and the second angles greater than 25° and smaller than 35° such that noise generated by the rotor part is inhibited, and
   wherein the first fixed plate includes:
      a ring-shaped edge part having the first vane parts formed thereon,
      a center part sunken from the edge part, and
      a plurality of through holes for heat dissipation formed in both the ring-shaped edge part and the center part.

2. The rotor assembly of claim 1, wherein the first imaginary circle is a circle connecting the outer ends of the plurality of first vane parts, and
   the second imaginary circle is a circle connecting the inner ends of the plurality of first vane parts.

3. The rotor assembly of claim 1, wherein the plurality of first vane parts are inclined in a rotation direction of a motor.

4. The rotor assembly of claim 1, wherein the plurality of first vane parts are inclined in the direction opposite to a rotation direction of a motor.

5. The rotor assembly of claim 1, wherein the first cover includes a through hole formed in the first fixed plate.

6. The rotor assembly of claim 1, wherein the rotor part includes a plurality of slits formed in a longitudinal direction, and
   the first cover includes a support part inserted into the plurality of slits and fixed to the rotor part.

7. The rotor assembly of claim 1, wherein the rotor part includes:
   a rotor core including a center part, a plurality of connection parts formed radially from the center part, and a plurality of protrusion parts protruding from both ends of the connection parts in a circumferential direction; and
   a first coil wound around the connection parts.

8. The rotor assembly of claim 7, comprising:
   a rotation shaft passing through the center part of the rotor core; and
   a terminal supported on the rotation shaft and applying power to the first coil.

9. The rotor assembly of claim 1, comprising a second cover covering the other side of the rotor part,
   wherein the second cover includes a second fixed plate covering the other side of the rotor part and a second vane part protruding from the second fixed plate, and
   the second cover is formed to be symmetrical to the first cover.

10. A motor comprising:
    a housing having a plurality of through holes formed on an outer circumferential surface thereof;
    a stator part supported by the housing; and
    a rotor assembly disposed to be rotatable around the stator part,
    wherein the rotor assembly includes:
    a rotor part; and
    a first cover including a first fixed plate covering one side of the rotor part, and a plurality of first vane parts protruding from the first fixed plate,
    wherein a first angle between an imaginary line extending from an outer end of each of the first vane parts and a tangential line of a first imaginary circle is greater than a second angle between an imaginary line extending from an inner end of each of the first vane parts and a tangential line of a second imaginary circle,
    wherein centers of the first imaginary circle and the second imaginary circle correspond to a center of the first fixed plate,
    wherein the tangential line of the first imaginary circle is a tangential line at a point at which the first imaginary circle and the outer end meet, wherein the tangential line of the second imaginary circle is a tangential line at a point at which the second imaginary circle and the inner end meet, wherein the first vane parts are configured to have the first angles greater than 50° and smaller than 60° and the second angles greater than 25° and smaller than 35° such that noise generated by the rotor part is inhibited, and wherein the first fixed plate includes:

a ring-shaped edge part having the first vane parts formed thereon, a center part sunken from the edge part, and a plurality of through holes for heat dissipation formed in both the ring-shaped edge part and the center part.

11. The motor of claim 10, wherein the housing includes:

a first housing disposed on one side of the stator part; and a second housing disposed on the other side of the stator part.

12. The motor of claim 11, wherein a part of the rotor assembly is exposed between the first housing and the second housing.

13. The motor of claim 10, wherein the housing includes a plurality of heat dissipation parts formed along an outer circumferential surface thereof.

14. The motor of claim 10, wherein the first imaginary circle is a circle connecting the outer ends of the plurality of first vane parts, and the second imaginary circle is a circle connecting the inner ends of the plurality of first vane parts.

15. The motor of claim 10, wherein the rotor part includes:

a rotor core including a center part, a plurality of connection parts formed radially from the center part, and a plurality of protrusion parts protruding from both ends of the connection parts in a circumferential direction; and a first coil wound around the connection parts.

16. The motor of claim 15, comprising:

a rotation shaft passing through the center part of the rotor core; and a terminal supported on the rotation shaft and applying power to the first coil.

\* \* \* \* \*